L. B. GRIFFITH.
Plow.
No. 10,085.
Patented Oct. 4, 1853.
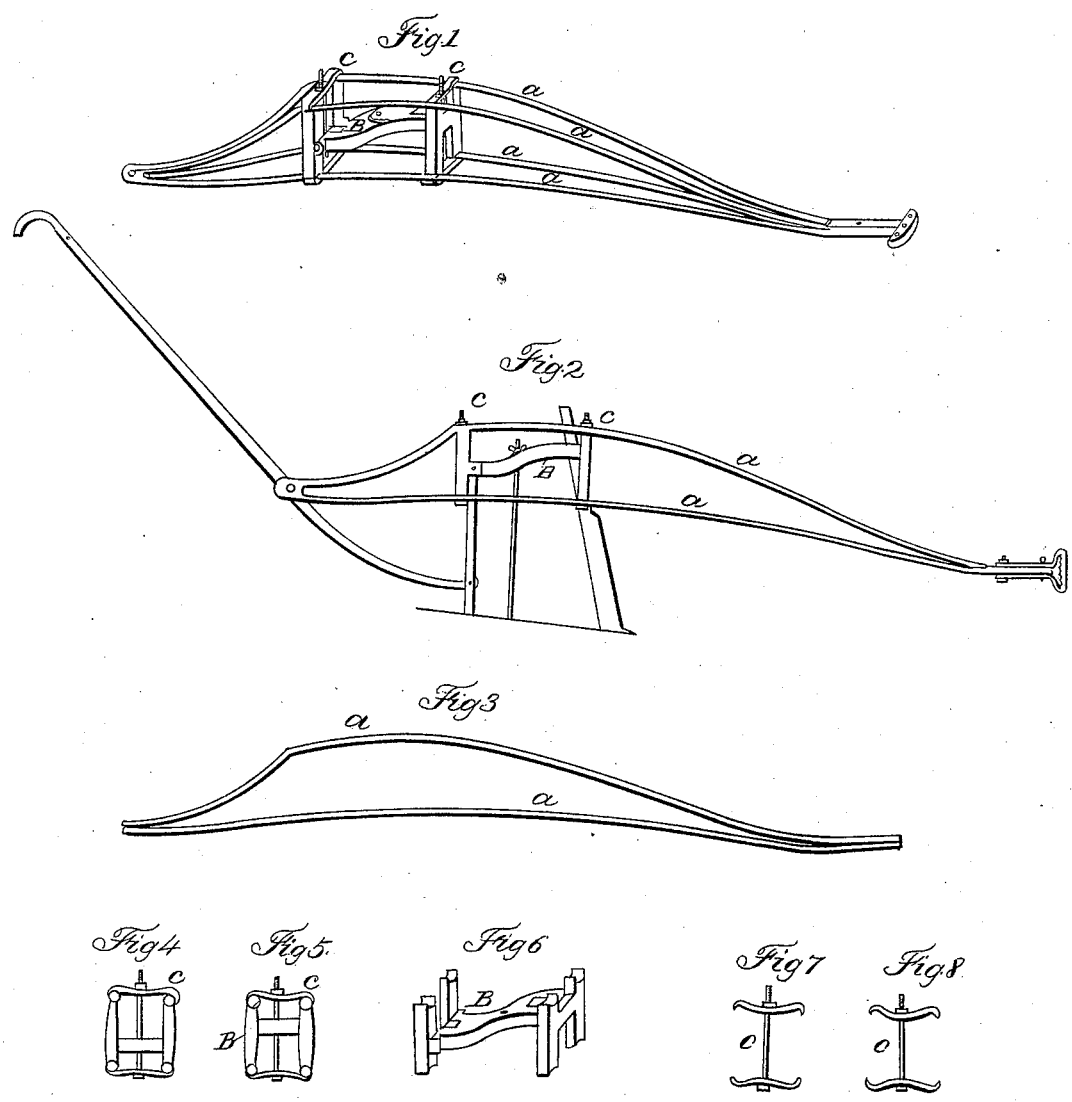

UNITED STATES PATENT OFFICE.

LEVI B. GRIFFITH, OF HONEYBROOK, PENNSYLVANIA.

IMPROVEMENT IN PLOW-BEAMS.

Specification forming part of Letters Patent No. 10,085, dated October 4, 1853.

*To all whom it may concern:*

Be it known that I, LEVI B. GRIFFITH, of Honeybrook, in the county of Chester and State of Pennsylvania, have invented a new and useful Improvement in Plow-Beams; and I do hereby declare that the following is a full, clear, and exact description of the same, reference being had to the annexed drawings, making a part of this specification, in which—

Figure 1 is a perspective view of the beam. Fig. 2 is a side elevation, showing how the other parts of the plow are attached to it. Fig. 3 is a side elevation of the rods before they are welded at the ends. Fig. 4 is an end view of the rear end of the center piece with the clamps attached. Fig. 5 is a view of the forward end of the same with clamps attached. Fig. 6 is a perspective view of the center piece without the clamps. Figs. 7 and 8 are views of the rear and forward clamps.

The same letters refer to like parts.

A A A A are four round rods of rolled iron. They are each of a uniform size from end to end, and are curved to the shape shown in Figs. 1 and 2, so that when placed in their position they converge to a point at some distance from each end, having considerable expansion between those two points. These rods, where united, are welded together, forming a solid mass at each end. The forward end is made a suitable shape to receive the clevis, with holes for attaching and regulating it, and the rear end a similar shape for attaching the other parts of a plow to it by a bolt.

B is a center piece, made of cast-iron, having at each end four projecting corners with grooves, in which the four rods A A A A rest and are partially embedded. Near the forward end of center piece, B, is a mortise, in which the plow-colter is secured, and near the rear end is a mortise, in which the plow-sheth is secured by a bolt passing through it. Between these two mortises is a round hole, through which the false colter passes.

C C are the clamps, which are made of iron, and consist of four plates and two bolts with screws and burrs attached. These plates are fitted across the rods directly over the corners of the center piece, B, and are held firmly in their places by the bolts which pass through each end of the center piece, and when screwed down they force the rods A A A A tightly into the grooves on the corners of the center piece, B, and thus prevent the possibility of either the center piece or rods moving out of their places.

Some of the advantages of this improvement are—

First, the rods, being light and each of a uniform size throughout, are formed the proper curve and put together without heating any part except the ends where welded together, thus effecting a great saving in labor, time, and material over those beams which require to be heated throughout and forged to a desired shape.

Second, as the rods are round and separated widely apart near the middle of the beam, as described, and held firmly and securely in their places by the center piece and clamps, a beam of great strength is produced which is much lighter than those in common use—a result greatly desired by agriculturists.

What I claim as my invention, and desire to secure by Letters Patent, is—

Constructing a plow-beam of four round iron rods, A A A A, center piece, B, and clamps C C, in combination, as described, the rods being of uniform size from end to end, curved to the shape specified, and welded together at the places designated, the center piece and rods being held firmly in their position by the clamps, the whole being constructed as described.

LEVI B. GRIFFITH.

Witnesses:
DAVID H. HACKETT,
DAVID H. HACKETT, Jr.